(12) United States Patent
Tsinberg et al.

(10) Patent No.: US 6,212,680 B1
(45) Date of Patent: Apr. 3, 2001

(54) MULTI-CHANNEL ELECTRONIC PROGRAMMING GUIDE AND SOFT PICTURE-IN-PICTURE ACQUISITION FOR USE WITH DIGITAL TELEVISION

(75) Inventors: Mikhail Tsinberg, Bx, NY (US); Bhavan Shah, E. Windsor, NJ (US); Bob Gupta, Robbinsville, NJ (US); Manabu Sakai, Princeton, NJ (US)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/034,265

(22) Filed: Mar. 4, 1998

(51) Int. Cl.[7] ....................................... H04N 5/50
(52) U.S. Cl. .................. 725/39; 725/38; 348/731; 348/563
(58) Field of Search ................... 348/473, 465, 348/487, 563, 565, 731, 732

(56) References Cited

U.S. PATENT DOCUMENTS

| | | | |
|---|---|---|---|
| 5,598,222 | * 1/1997 | Lane | 348/568 |
| 5,684,525 | * 11/1997 | Klosterman | 348/12 |
| 5,699,125 | * 12/1997 | Rzescewski et al | 346/563 |
| 5,815,206 | * 9/1998 | Malladi et al. | 348/390 |
| 5,847,771 | * 7/2000 | Cloutier et al. | 348/564 |
| 5,877,817 | * 3/1999 | Moon | 348/564 |
| 5,959,690 | * 9/1999 | Toebes et al. | 348/578 |
| 6,005,546 | * 12/1999 | Keene | 345/154 |
| 6,091,458 | * 7/2000 | Jeon et al. | 348/554 |

* cited by examiner

Primary Examiner—Andrew Faile
Assistant Examiner—Reuben M. Brown
(74) Attorney, Agent, or Firm—Finnegan, Henderson, Farabow, Garrett & Dunner, L.L.P.

(57) ABSTRACT

Multi-channel Electronic Program Guide acquisition and soft picture-in-picture system for use with digital television receiver. The digital television receiver uses its central processing unit (CPU) to perform a software decode of packets received from a main tuner and/or a picture-in-picture. This allows the CPU to display video from pictures within the same RF channel or within another channel simultaneously with video information decoded in real-time by a hardware decoder. Also, in the case of a digital television with two tuners, the CPU can acquire and accumulate EPG data from multiple channels.

2 Claims, 6 Drawing Sheets

Fig. 6

MULTI-CHANNEL ELECTRONIC PROGRAMMING GUIDE AND SOFT PICTURE-IN-PICTURE ACQUISITION FOR USE WITH DIGITAL TELEVISION

BACKGROUND

1. Field of the Invention

The present invention relates generally to digital television and more specifically to the acquisition and display of picture-in-picture video and Electronic Program Guide information on a digital television receiver.

2. Description of the Related Art

The Advanced Television Systems Committee (ATSC) has proposed a digital television standard in which audio and video information will be transmitted in digital form. Digital signals have a number of benefits over traditional analog transmissions, including greater flexibility in the kinds of information that can be transmitted along with audio and video information, ease of compression of broadcast signals to conserve bandwidth, and convenient manipulation of information at the receiving end.

Figure 1:
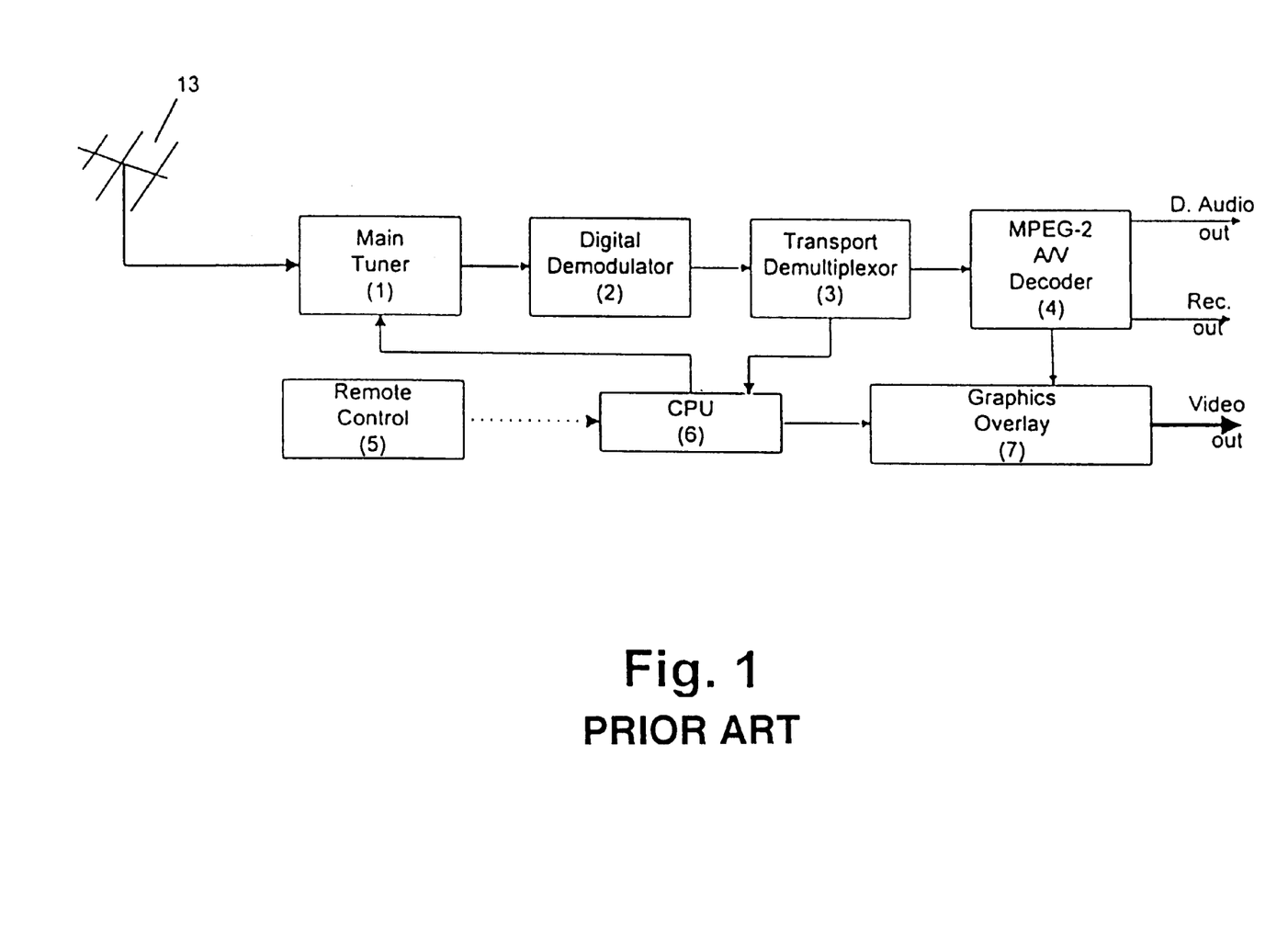
FIG. 1 is a drawing of a digital television receiver system having a single tuner and a single hardware decoder.

A typical digital television architecture is shown in FIG. 1. On the transmitting side (not shown), digital signals are compressed using the MPEG-2 compression standard and broken up into a packetised elementary stream (PES) that, under the current standard, are combined into packets of data each containing 188 bytes of information. The packets are modulated onto a radio frequency (RF) carrier signal and broadcast. All broadcast signals, each corresponding to a particular television channel, are received through an antenna 13 that passes the signals to a main tuner 1. Main tuner 1 has been tuned by a central processing unit (CPU) 6, according to input from a remote control 5, to select one of the broadcast signals. Main tuner 1, in turn, passes the selected broadcast signal to a digital demodulator 2 where the packets are demodulated from the carrier signal into a byte-aligned baseband signal. The packets of data are then provided to a transport demultiplexor 3.

Transport demultiplexor 3 performs a number of functions. It buffers incoming packets, extracts clock information from them to perform synchronization, and separates and processes audio, video, and data packets. The separated audio and video packets are provided to an MPEG-2 audio/video (A/V) decoder 4, which decompresses the digital video and audio signals and converts them to analog form. The analog video signal is supplied to a graphics overlay 7 that combines the video with on-screen display (OSD) information supplied by CPU 6 and generates a video out signal for display on a screen (not shown).

Figure 2:
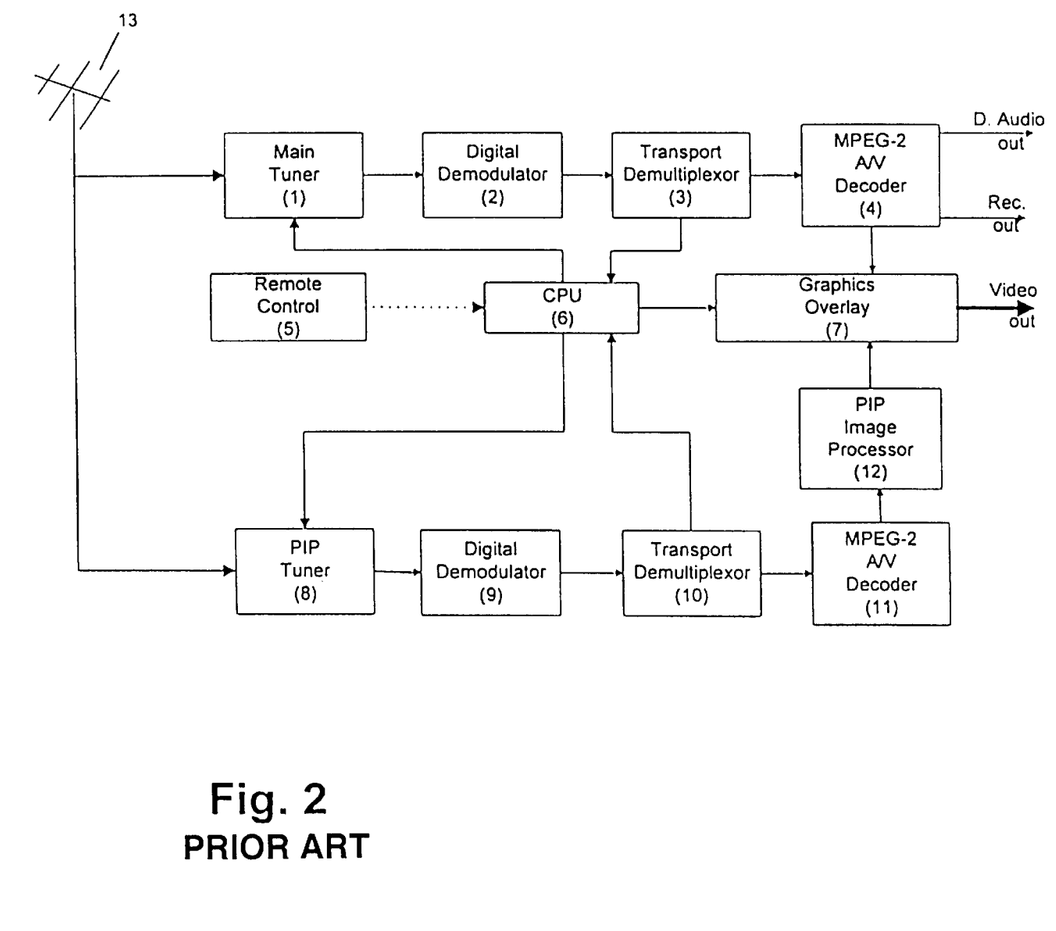
FIG. 2 is a drawing of typical digital television receiver system having two tuners and two hardware decoders.

One problem with this configuration is that, since the digital television has only a single tuner, a viewer cannot tune to different channels at the same time. The ability to simultaneously tune to more than one channel has the advantage of being able to view programs from separate channels at the same time, such as in a picture-in-picture (PIP) format. The PIP format typically takes the form of a smaller video picture displayed within a larger one. A digital television architecture for implementing traditional picture-in-picture processing is shown in FIG. 2. This architecture includes the components of FIG. 1 and additional components dedicated to displaying a program from a second television channel.

Specifically, signals from antenna 13 are sent to a PIP tuner 8 which is tuned to a particular channel by CPU 6. PIP tuner 8 passes the tuned channel to a digital demodulator 9 where packets are demodulated from the carrier signal. The packets of data are then provided to a transport demultiplexor 10 that performs the same finctions described above with reference to transport demultiplexor 3. An MPEG-2 A/V decoder 11 receives audio and video packets from transport demultiplexor 10, which decompresses the digital video and audio signals and converts them to analog form. The analog video signal is supplied to a PIP image processor 12. PIP image processor 12 is a hardware block that performs 2-D filtering and sub-sampling to effectively squeeze the PIP image into a smaller size. PIP image processor 12 sends the image to graphics overlay 7, which combines the main image, the PIP image, and OSD information into a video out signal.

This technique of providing PIP, however, is very costly. One of the most expensive components in a digital television system is the MPEG-2 decoder. In the implementation shown in FIG. 2, two such MPEG-2 decoders are required to achieve a picture-in-picture display.

Moreover, the systems of FIGS. 1 and 2 both have the disadvantage that they can only display Electronic Program Guide (EPG) information contained within the tuned channel. As noted above, the current broadcast standard allows for data packets to be transmitted along with video and audio packets. Certain data packets contain an EPG that is inserted into the digital channel assigned to each broadcaster. The EPG acts as an on-screen guide showing, for example, the names and durations of current and future programs within the tuned channel. Under the current standard, however, there is no requirement that one broadcaster include the program listings of other broadcasters in the EPG transmitted with their channel. In other words, if a viewer tuned to a particular channel and called up the EPG, it would only show the program information for the tuned channel. It would not include EPG information for programs in other broadcast channels. To get this information, the viewer suffers the inconvenience of having to tune to each of the other broadcast channels.

These problems indicate the need for a mechanism that provides users an inexpensive way to achieve picture-in-picture viewing while also allowing accumulation of EPG information from a number of different broadcast channels.

SUMMARY OF THE INVENTION

Accordingly, the present invention is directed to a system and method for acquiring and displaying picture-in-picture information while, at the same time, providing the capability to acquire and accumulate EPG information from different channels. The system and method have the dual benefits of providing PIP display at a cost-savings and allowing the digital television to present to the viewer more complete information about programming availability on all broadcast channels.

Additional features and advantages of the invention will be set forth in the description which follows, and in part will be apparent from the description, or may be learned by practice of the invention. The objectives and other advantages of the invention will be realized and attained by the system and method particularly pointed out in the written description and claims hereof as well as the appended drawings.

To achieve these and other advantages and in accordance with the purpose of the invention, as embodied and broadly described, a digital television consistent with the present invention includes a first tuner, a second tuner, a hardware decoder configured to receive and decode video signals from the first tuner, and a processor configured to receive and decode in software video signals from the second tuner.

In another aspect, a method for acquiring electronic program guide information in a digital television consistent with the present invention includes the steps of automatically tuning the second tuner to a first channel, receiving and decoding signals representing electronic program guide information when the second tuner is tuned to the first channel, automatically tuning the second tuner to a second channel, and receiving and decoding signals representing electronic program guide information when the second tuner is tuned to the second channel.

In yet another aspect, a method for providing simultaneous display of video information from a first channel and from a second channel consistent with the present invention includes the steps of receiving a first video stream from a hardware decoder that receives signals from a first tuner tuned to the first channel, receiving a second video stream from a processor that receives signals from a second tuner tuned to the second channel, and combining the first and second video streams.

In yet another aspect, a digital television consistent with the present invention includes a tuner, a demodulator coupled to the tuner, a transport demultiplexor coupled to the demodulator, a hardware decoder configured to receive and decode video signals from the transport demultiplexor, and a processor configured to receive and decode in software video signals from the transport demultiplexor.

Both the foregoing general description and the following detailed description are exemplary and explanatory and do not restrict the invention as claimed.

BRIEF DESCRIPTION OF THE DRAWINGS

The accompanying drawings, which are incorporated in and constitute a part of this specification, illustrate embodiments of the invention and, together with the description, explain the principles of the invention.

DETAILED DESCRIPTION OF THE PREFERRED EMBODIMENTS

Reference will now be made in detail to the present preferred embodiments of the invention, examples of which are illustrated in the accompanying drawings. Where possible, like numerals are used to refer to like or similar components.

Generally, the present invention allows picture-in-picture capability without the use of two hardware MPEG-2 decoders as required in a typical digital television system. Instead, the existing CPU of the digital television is used to decode packets. Such an implementation still allows the display of PIP while also allowing acquisition of EPG data from multiple channels without having to re-tune the main tuner.

Two embodiments of the present invention will now be described with reference to FIG. 1. In the current digital television standard, it is possible to transmit programs at different levels of definition, such as standard definition and high definition. Standard definition (SD) programs are comparable in resolution to current analog transmissions. High definition (HD) programs use a higher resolution to convey a clearer image. Because of bandwidth restrictions, a broadcaster can broadcast a single HD program in a particular RF channel. The lower resolution of SD programs, however, allows several such programs to be broadcast in a single RF channel.

The system of FIG. 1 can operate differently depending on the architecture of the hardware MPEG-2 A/V decoder 4 used to accommodate these possible transmissions. First, a single HD or MP@HL (main profile high level) decoder may be used that is capable of decoding both SD and HD formats, but only one at a time. Second, multiple SD or MP@ML (main profile main level) decoders may be used in a scalable architecture. The multiple SD decoders can work individually to simultaneously decode multiple SD pictures in real-time, or they can work in tandem to decode a single HD picture in real-time.

In the case where MPEG-2 A/V decoder 4 is a single HD decoder, the architecture of FIG. 1 can, consistent with the present invention, be used to display picture-in-picture provided that multiple SD pictures are provided within the same RF channel. In that case, the packets from transport demultiplexor 3 are sent to both MPEG-2 A/V decoder 4 and CPU 6. Since MPEG-2 A/V decoder 4 is a single HD decoder, it can only decode one of the SD pictures provided within the tuned RF channel, which it provides to graphics overlay 7. CPU 6, however, can be used to perform a software decode of other SD pictures provided within the same RF channel. Any of various well-known algorithms for performing MPEG-2 decoding in software may be used.

Depending on the processing power of CPU 6, it may not be capable of providing realtime decoding of packets provided by transport demultiplexor 3. In this case, CPU 6 can decode only selected frames, such as I frames, resulting in non-real-time video. The video packets decoded by CPU 6 are then provided to graphics overlay 7 for display in a "soft," meaning software, picture-in-picture format. In sum, this configuration allows the soft picture-in-picture display of one or more SD pictures in another SD picture provided that all the pictures are transmitted in the same RF channel.

In another embodiment, MPEG-2 A/V decoder 4 can be based on the scalable architecture of SD decoders discussed above. This embodiment provides additional flexibility when main tuner 1 is tuned to an RF channel containing multiple SD pictures. First, MPEG-2 A/V decoder 4 is now capable of decoding more than one of the SD pictures in real-time. Thus, it can provide multiple real-time SD pictures to graphics overlay 7 for simultaneous display on the digital television. In addition, MPEG-2 A/V decoder 4 can output one of the decoded SD pictures to a storage mechanism, such as a VCR. Second, CPU 6 can be used to perform a software decode of video packets provided by transport demultiplexor 3. CPU 6 provides decoded SD pictures to graphics overlay 7 for display on the digital television as a soft picturein-picture. Thus, this embodiment allows display of multiple SD pictures provided within the same RF channel.

Two more embodiments consistent with the present invention will now be described with reference to FIG. 3. The processing of a broadcast channel through main tuner 1 proceeds according to the description above. The PIP processing, however, has been modified from that of FIG. 2 such that the output of transport demultiplexor 10 is sent to CPU 6, but not to a separate hardware MPEG-2 decoder.

Figure 3:
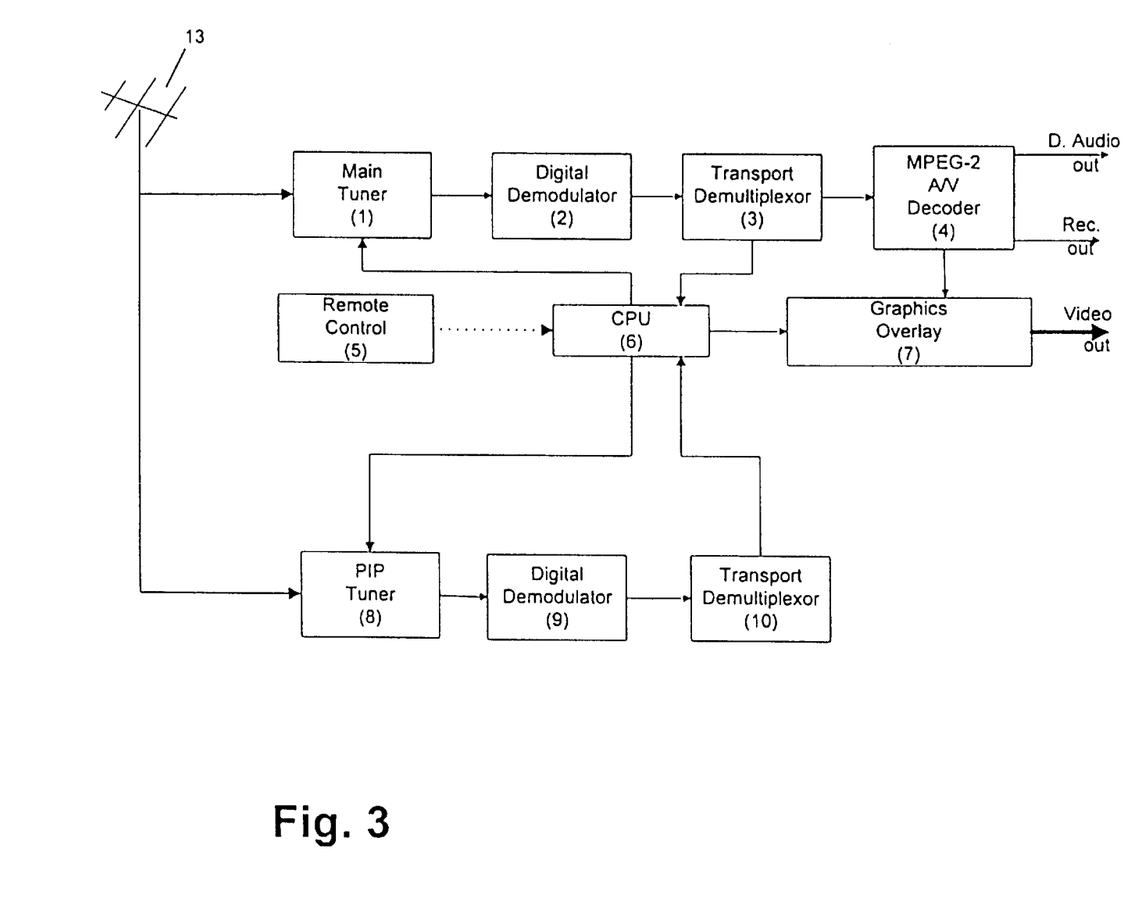
FIG. 3 is a drawing of a digital television receiver system having two tuners and a single hardware decoder.

Similar to the architecture of FIG. 1, the architecture of FIG. 3 provides several advantageous capabilities depending on the type of MPEG-2 A/V decoder 4 used. In one variation, MPEG-2 A/V decoder 11 could be a single HD decoder. In this case, MPEG-2 A/V decoder 4 can decode a single HD or SD picture provided within an RF channel. Consistent with the present invention, however, CPU 6 has the capability to perform a software decode on packets received from both transport demultiplexor 3 and transport demultiplexor 10. For example, suppose PIP tuner 8 is tuned to a channel containing either a single HD picture or multiple SD pictures. CPU 6 receives these packets from transport demultiplexor 10 and performs a software decode of the single HD picture, or one or more of the SD pictures. At the option of the viewer, CPU 6 can provide the video information to graphics overlay 7, effectively allowing the display of programs from different RF channels in a soft picture-in-picture format. This system has the advantage of obviating the need for a second hardware MPEG-2 A/V decoder, which is typically an expensive component.

In addition, as noted, CPU 6 can receive and decode packets from transport decoder 3. Suppose main tuner 1 is tuned to an RF channel containing multiple SD pictures. In this embodiment, MPEG-2 A/V decoder 4 can only decode one of these SD pictures. CPU 6, however, can receive and decode other SD pictures contained within the same RF channel. At the option of the viewer, CPU 6 can provide these decoded video signals to graphics overlay 6 for display on the digital television.

In another embodiment associated with FIG. 3, MPEG-2 A/V decoder 4 can be based on the scalable architecture of SD decoders discussed above. Such a configuration has all the benefits associated with the use of a single HD decoder described above but allows for additional capabilities. In particular, MPEG-2 A/V decoder can decode in real-time multiple SD pictures provided in the same RF channel. It can provide these multiple-decoded pictures to graphics overlay 7 for display on the digital television, and/or it can send a real-time SD picture to a storage device, such as a VCR.

The configuration of FIG. 3, in either embodiment, has the additional benefit of allowing acquisition of EPG information from different RF channels while the viewer stays tuned to a particular channel on main tuner 1. As described above, the current broadcast standard does not require a particular broadcaster to carry EPG information of other broadcasters. Thus, if a viewer calls up the EPG when tuned to a channel, he will only see the program information associated with that channel.

Figure 4:
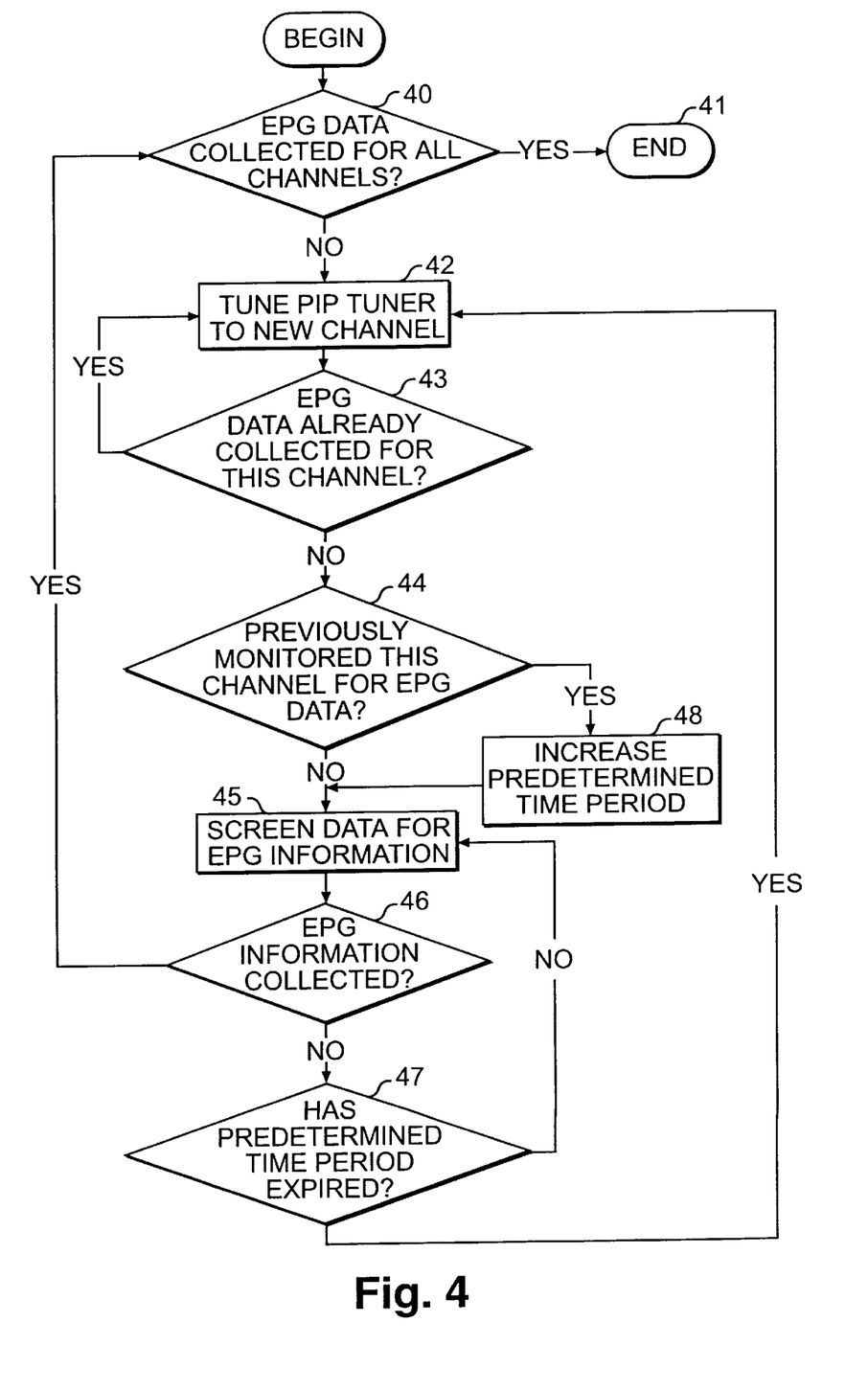
FIG. 4 is a flowchart showing the steps for performing multi-channel EPG acquisition consistent with a first embodiment of the present invention.

The system of FIG. 3 solves this problem by using PIP tuner 8 and CPU 6 to collect and combine EPG information from other channels. The steps for collecting EPG data are shown in FIG. 4. First, CPU 6 determines if it has already collected EPG data from all the digital channels (step 40). If so, the routine ends (step 41). Otherwise, CPU 6 tunes PIP tuner 8 to a new channel (step 42) and determines if EPG data has already been collected for that particular channel (step 43). If so, CPU 6 tunes PIP tuner 8 to another channel (step 42), and this process continues until a channel for which no EPG data has been collected is found.

Alternatively, CPU 6 can maintain a database stored in a memory connected to CPU 6 indicating which channels it has and has not collected EPG data from and tune PIP tuner 8 to one of the latter channels.

CPU 6 then determines if it has previously attempted to collect EPG data from the tuned channel (step 44). It could do this by checking a database containing a list of previously monitored channels. If this is the first attempt to collect EPG data from the tuned channel, then CPU 6 begins screening for EPG data (step 45). If EPG data is detected (step 46), it is stored and combined with other collected EPG data. The process then returns to step 40. While monitoring for EPG data, CPU 6 also monitors the amount of time it has been tuned to the particular channel (step 47). If this time exceeds a predetermined time, for example one minute, then CPU 6 tunes PIP tuner 8 to a different channel (step 43). If, in step 44, CPU 6 determines that it has previously and unsuccessfully attempted to collect EPG data from the tuned channel, then it increases the amount of time, to two minutes for example, that it will monitor the channel (step 48).

At the conclusion of this process, CPU 6 will have gathered EPG information from all the digital channels. It combines this information so that, upon request of the viewer, the entire EPG can be displayed using graphics overlay 7.

Figure 5:
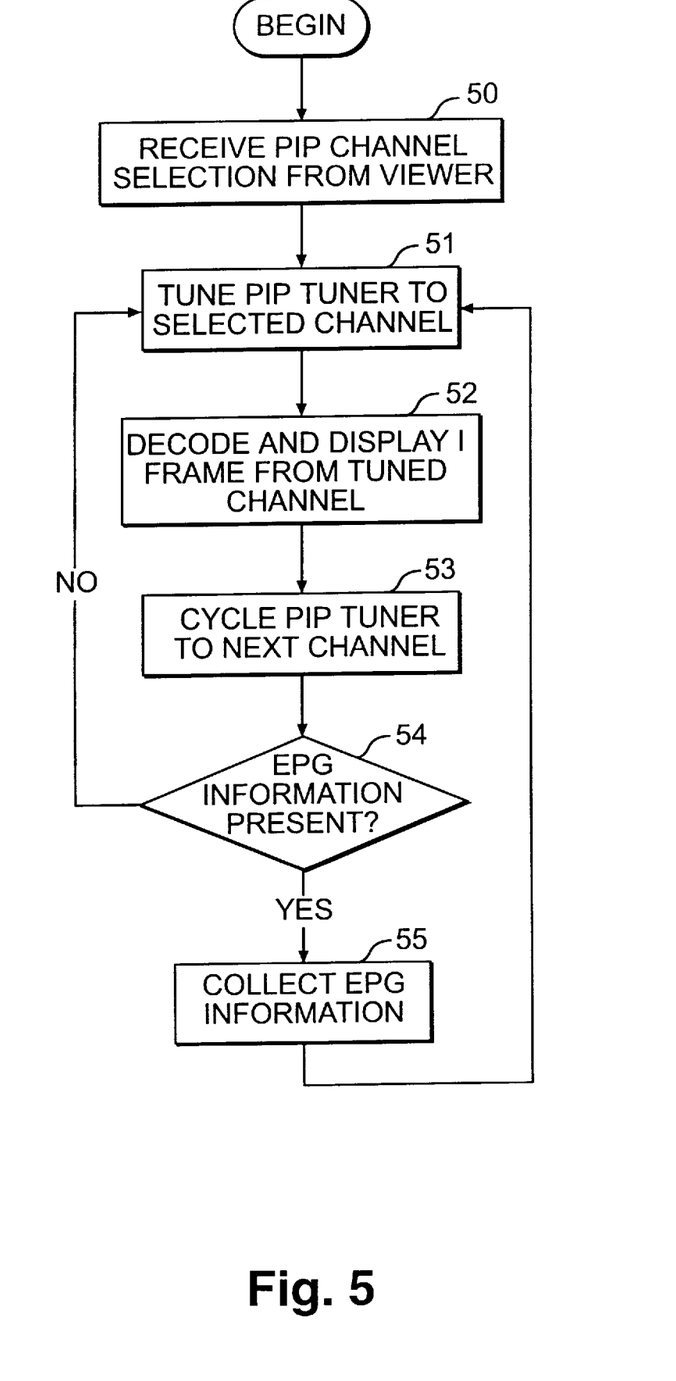
FIG. 5 is a flowchart showing the steps for performing multi-channel EPG acquisition and picture-in-picture display consistent with a second embodiment of the invention.

In another embodiment, CPU 6 continuously searches all digitally broadcast channels looking for EPG information. When it receives EPG information, CPU 6 integrates it into existing EPG information. This method has the advantage that CPU 6 can perform multi-channel EPG searching and soft PIP display simultaneously. The flowchart of FIG. 5 shows the steps for carrying out this process.

First, assume a viewer commands CPU 6 to tune PIP tuner to a particular channel. CPU 6 receives this channel selection (step 50) and tunes PIP tuner 8 to the selected channel (step 51). CPU 6 receives, decodes, and displays as many frames of video information its processing speed can handle, but it at least displays an I frame (step 52). The frames of video would appear in a window inside the image provided by main tuner 1. Then, CPU 6 tunes PIP tuner 8 to a different channel to collect EPG information (step 53). If EPG information is present on the channel (step 54), it is collected and combined with previously acquired EPG information (step 55). Otherwise, CPU 6 tunes PIP tuner 8 back to the channel selected by the viewer (step 51) to receive, decode, and display more video frames (step 52). This tuning and re-tuning of PIP tuner 8 continues until CPU 6 has collected EPG information from all the channels. The time it takes to collect EPG data while viewing picture-in-picture will depend on the processing speed of CPU 6.

Figure 6:
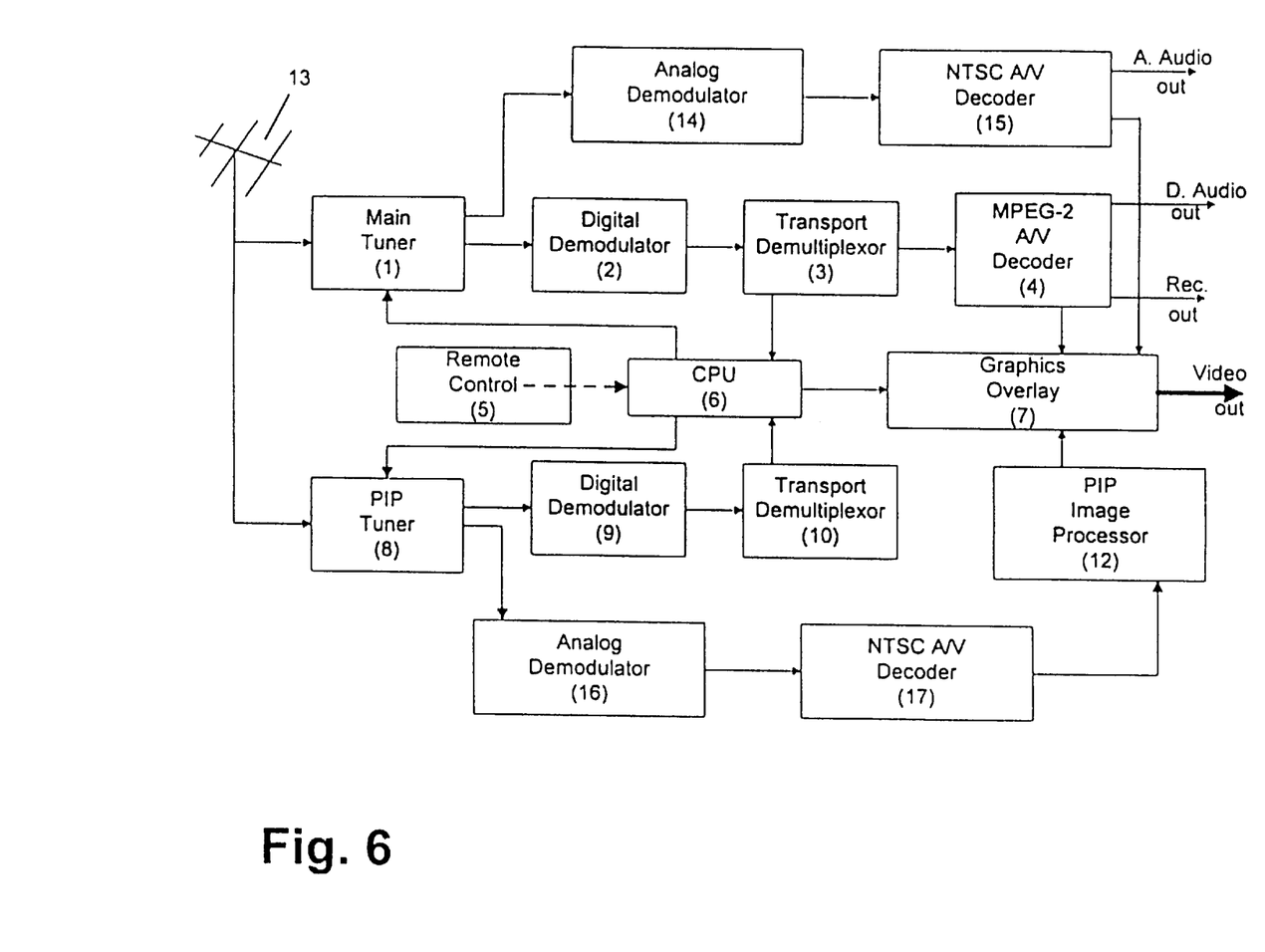
FIG. 6 is a drawing of a digital and analog television receiver system consistent with the present invention.

During the transition period from analog to digital broadcast systems, televisions will likely support both transmissions. It should be noted that the present invention will function equally well in such hybrid systems. An example of an analog and digital television receiver consistent with the present invention is shown in FIG. 6. The receiver includes the same digital components of FIG. 3 with additional analog components to accommodate analog channels. Specifically, if main tuner 1 is tuned to an analog channel, the signal is directed to an analog demodulator 14 that demodulates the RF signal to a baseband signal and passes it to an NTSC (Networking and Telecommunication Standing Committee) A/V decoder 15. NTSC A/V decoder 15 decodes the signal to color components, providing an analog audio out signal and providing an analog video signal to graphics overlay 7. The processing of an analog transmission through PIP tuner 8 proceeds similarly. The signal passes to an analog demodulator 16, an NTSC A/V decoder 17, and to PIP image processor 12 that supplies an analog video signal to graphics overlay 7.

It will be apparent to those skilled in the art that various modifications and variations can be made in the present invention without departing from the spirit or scope of the invention. It is intended that the present invention cover these and other modifications and variations of this invention provided they come within the scope of the appended claims and their equivalents.

We claim:

1. A method of acquiring electronic program guide information for a plurality of channels using a digital television receiver having a first tuner and a second tuner comprising the steps of:

a) receiving a command from a user to tune the second tuner to a first channel;
b) tuning the second tuner to the first channel;
c) receiving and decoding video signals from the second tuner;
d) automatically tuning the second tuner to at least one of said plurality of channels other than said first channel;
e) receiving and decoding signals representing electronic program guide information from the at least one of said plurality of channels; and
f) repeating steps b) through e).

2. The method of claim 1 wherein the displaying step includes a step of: displaying the decoded video signals in a picture-in-picture format.

* * * * *